United States Patent [19]

Nagai et al.

[11] 4,025,566

[45] May 24, 1977

[54] PROCESS FOR PREPARING MONOALKYL ETHERS OF DIHYDRIC PHENOLS

[75] Inventors: Shigeki Nagai; Hiroshi Yoshida; Teruhiko Inoue, all of Ube, Japan

[73] Assignee: UBE Industries, Ltd., Ube, Japan

[22] Filed: Feb. 10, 1976

[21] Appl. No.: 656,938

[30] Foreign Application Priority Data

Mar. 14, 1975 Japan .............................. 50-30064

[52] U.S. Cl. .......................... 260/613 D; 252/432
[51] Int. Cl.$^2$ ......................................... C07C 41/00
[58] Field of Search ................................. 260/613 D

[56] References Cited

UNITED STATES PATENTS

| | | | |
|---|---|---|---|
| 2,615,051 | 10/1952 | Grote | 260/613 D |
| 2,782,239 | 2/1957 | Mavity | 260/613 D |
| 3,895,076 | 7/1975 | Bauer et al. | 260/613 D |

*Primary Examiner*—Bernard Helfin
*Attorney, Agent, or Firm*—Flynn & Frishauf

[57] ABSTRACT

Process for preparing monoalkyl ethers of dihydric phenols using a catalyst comprising Al, B and P.

10 Claims, No Drawings

PROCESS FOR PREPARING MONOALKYL ETHERS OF DIHYDRIC PHENOLS

This invention relates to a process for preparing monoalkyl ethers of dihydric phenols. More particularly, this invention relates to a process for preparing monoalkyl ethers of dihydric phenols by etherifying dihydric phenols with lower alcohols using a catalyst comprising aluminum, boron and phosphorus.

The term dihydric phenols used in this invention mean dihydric phenols which may be substituted with a lower alkyl radical having 1 – 4 carbon atoms or a halogen atom. The dihydric phenols used in this invention are a follows: catechol, hydroquinone, resorcin, 4-methylcatechol, 2-methylhydroquinone, 4-chlorocatechol, 2-chlorohydroquinone, etc. The lower alcohols mean straight or branched aliphatic alcohols having 1 – 4 carbon atoms and are as follows: methanol, ethanol, propanol, isopropanol, n-butanol, isobutanol, etc.

As to processes for preparing monoalkyl ethers of dihydric phenols by the action of alcohols on dihydric phenols in a gaseous state, there are known the following processes:

a. a process of carrying out the reaction in a molar ratio of 1:6 of catechol to methanol at a temperature of about 300° C using a catalyst comprising boric acid and phosphoric acid, especially boron phosphate (C.A., 55, 7336 (1960), Masloboino-Zhirovaya Prom., 26, No. 10, 24–7 (1960). In this case, the yield of gauiacol is 50 – 60% and that of veratrol 4 – 6%. The yield of guaiacol using alumina $Al_2O_3$) as a catalyst is 48%;

b. a process for carrying out the reaction at a temperature of 250°– 260° C using a catalyst comprising boric acid and phosphoric acid, especially boron phophate (West German Pat. No. 827803). In this case, the conversion of catechol is 64.9%, the selectivity of guaiacol 84.6% and that of veratrol 11.5%;

c. process for carrying out the reaction at 200°– 240° C in a liquid state in a molar ratio of 1:3.44 of catechol to methanol using boron phosphate catalyst as in (b). (Japanese Pat. No. 28439/1973). In this case, the conversion of catechol is 62.0%, the selectivity of guaiacol 91.1% and that of veratrol 1.2%.

The above reactions have the following defects on the use of the respective catalysts:

1. Boron phosphate catalyst-cases of (a), (b) and (c)
This catalyst has high activity (the conversion of catechol is 50 – 65%) and high selectivity (the selectivity is 80 – 90%) on preparation of guaiacol from catechol. But, according to the results of continuous experiments, boron phosphate reacts with catechol and is eluted with catechol, so that its amount decreases in proportion to the whole amount of the catechol charged. Further, the long-term use of the catalyst causes deterioration of its activity. Therefore, it is impossible to use this catalyst in industrial practice for a long-term continuous use.

2. Alumina catalyst causes alkylation on an aromatic nucleus, so that the selectivity of etherification drops remarkably.

Therefore, we have tested various catalysts to avoid the defects mentioned above and found that the a catalyst comprising aluminum, boron and phosphorus has high activity and good selectivity and does not decrease in amount during its long-term use and retain high activity for long-term use, so that it has excellent practical use in industry, thus completing this invention.

This invention is now explained in detail. The term catalyst comprising aluminum, boron and phosphorus according to this invention means an atomic ratio of from 1:1:2 to 1:3:4 of Al:B:P and is prepared by using an aluminum salt, boric acid (or salt) and phosphoric acid (salt), for example, aluminum hydroxide (Al(OH)$_3$), boric acid (H$_3$BO$_3$), and phophoric acid (H$_3$PO$_4$), adjusting the atomic ratio of Al:B:P to be from 1:1:2 to 1:3:4, drying, calcinating and shaping in an usual way and the preparation is not limited thereto.

When the above catalysts are used especially for the preparation of guaiacol from catechol, they retain high activity for long-term use, the amount thereof does not decrease during the reaction, and guaiacol is obtained in high selectivity of above 90% (the conversion is about 30 – 50%). This makes possible the economical preparation of guaiacol from catechol using methanol. Furthermore, veratrol, which has almost no difference in boiling point (1°– 2° C) from guaiacol and therefore, is not obtainable by separation with distillation, is obtained in a selectivity of below 1%, so that the separation of both the compounds is not necessary. This fact means that this process has an excellent advantage over prior processes from the standpoint of separation and purification. This process is also applicable for industry in that methyl etheration of resorcin and hydroquinone results in the same manner, but in this case the dimethyl ethers are obtained in somewhat greater amounts than with catechol. These dimethyl ethers having boiling point difference in a range of 20°– 30° C from the monomethyl ethers, so that they are possible to separate and purify by distillation and there is no problem for industrialization of this process.

The results obtained with methanol can be obtained in the same way with ethanol and the formation of diethyl ethers is much less than with methanol.

As is clear from the above explanation, the catalysts according to this invention have industrial use sufficient for the preparation of monoalkyl ethers of dihydric phenols.

As to the reaction apparatus for the industrial application of this invention, it is preferable to use a fixed bed process under atmospheric pressure.

The following reaction tube is illustrative of one embodiment of this invention. The reaction tube is made of quarty glass of 28 mm$\phi$ × 400 mm. On the top of the catalyst layer are filled glass balls for preheating the reactant. The reaction temperature is measured by inserting a thermo-cupple in the middle of the catalyst layer.

Dihydric phenols and a lower alcohol may be fed in a mixture or a solution in an inert solvent. The reaction temperature is preferably at 250°– 350° C. The ratio of dihydric phenol to lower alcohol is in a range of 2 – 0.1 by weight. They have also found that instead of the above catalyst comprising aluminum boron and phosphorus, a catalyst comprising aluminum and phosphorus is used for the same object and has the same activities as those of the above catalyst when it is used only in the following conditions, that is, in case a trace of boron phosphate is charged into a mixture of dihydric phenol and alcohol to be fed. A catalyst comprising aluminum and phosphorus means aluminum phosphate and the ratio of Al:P is 1:1. The aluminum phosphate catalyst is prepared by using phosphoric acid (H$_3$PO$_4$) and aluminum hydroxide Al(OH)$_3$ or by neutralizing a mixture of aluminum and phosphate salt with alkali and precipitating. The aluminum phosphate thus obtained is dried, calcined and formed in shape in an usual manner.

The amount of boron phosphate to be added to a mixture of dihydric phenol and lower alcohol is preferred to be 30 - 500 ppm. As one embodiment, the mixed liquid is fed on the top of the reaction vessel preheated with glass balls and evaporated in the catalyst layer to be subjected and subjected to gaseous reaction. The reaction conditions such as reaction temperature, reaction vessel and rate of the reactant charged are the same as described above.

The monoalkyl ethers of dihydric phenols obtained accoring to this invention are applicable as intermediates for pharmaceuticals and perfumes, and for antioxidants and stabilizing agents for synthetic resins.

This application is explained by the following examples but these are not meant to limit the scope of the claims.

EXAMPLE 1

The catalyst used was prepared by mixing $Al(OH)_3$, $H_3BO_3$ and $H_3PO_4$ so as to have a atomic ratio of 1:1:2, calcining at 500° C and sieving in 14 – 20 mesh screen, and 20g of the catalyst thus obtained was employed. The reaction tube used was made of quartz glass of 28 mm$\phi$ × 400 mm. On the top of the catalyst layer were filled glass balls for preheating the reactant. The reaction temperature was measured by inserting a thermocouple in the middle of the catalyst layer. After the temperature of the catalyst layer reached 300° C, a mixture of catechol and methanol in a ratio of 1:1 by weight was fed in a rate of 18g/hr with a small quantitative pump. Nitrogen was used as carrier gas. After cooling, the reaction mixture was collected and subjected to gas chromatography for analyzing guaiacol, veratrol and catechol.

Sampling after one hour of the reaction:
The conversion of catechol : 40.1%
The selectivity and yield of guaiacol : 94.7% and 38.0%, respectively
The selectivity of veratrol : 0.8%
Sampling after 20 hours of the reaction:
The conversion of catechol : 35.7%
The selectivity and yield of guaiacol : 96.1% and 34.3%, respectively
The selectivity of veratrol : 0.5%.

EXAMPLE 2

The same catalyst as in Example 1 was employed and the reaction temperature was regulated at 280° C. A mixture of catechol and ethanol in a ratio of 1:1 by weight was fed in a rate of 18g/hr.
The conversion of catechol : 37.7%
The selectivity and yield of catechol monoethyl ether: 95.4% and 36.0%, respectively
The selectivity of catechol diethyl ether : 0.3%

EXAMPLE 3

The same catalyst as in Example 1 was employed and a mixture of hydroquinone and methanol in a ratio of 1:3 by weight was fed in a rate of 18g/hr under the same conditions as in Example 1.
The conversion of hydroquinone : 42.0%
The selectivity and yield of hydroquinone monomethyl ether : 85.9% and 36.1%, respectively The selectivity of hydroquinone dimethyl ether : 8.2%

The catalysts in the above examples neither decrease in amount nor deteriorate during a long-term continuous use.

EXAMPLE 4

The catalyst used was prepared by mixing $Al(OH)_3$, $H_3BO_3$ and $H_3PO_4$ so as to have an atomic ratio of Al:B:P = 1:3:4, drying, tabulating and calcinint at 500° C, and 20g of the catalyst thus obtained was used. The reaction tube used in Example 1 was used. After the temperature of the catalyst layer reached 280° C, a mixture of catechol and methanol in a ratio of 1:1 by weight was fed in a rate of 36g/hr with a small quantitative pump. Nitrogen was used as carrier gas. After cooling, the reaction mixture was collected and subjected to gas chromatography for analyzing guaiacol, veratrol and catechol.

Sampling after one hour's reaction:
The conversion of catechol : 50.3%
The selectivity and yield of guaiacol : 92.0% and 46.3%, respectively
The selectivity of veratrol : 0.9%
Sampling after 40 hours' reaction:
The conversion of catechol : 45.7%
The selectivity and yield of guaiacol : 93.1% and 42.5%
The selectivity of veratrol : 0.8%
The amount of the catalyst remained constant after 35 hours.

EXAMPLE 5

The catalyst was prepared by adjusting a mixture of $Al(OH)_3$, $H_3BO_3$ and $H_3PO_4$ so as to have an atomic ratio of Al:B:P = 1:1.67:2.67, drying, calcining and sieving in a 14 – 20 mesh screen and 15g of the catalyst thus obtained uas used. The reaction tube used in Example 1 was used. After the temperature of the catalyst layer was regulated at 280° C, a mixture of catechol and methanol in a ratio of 1:1 by weight was fed in a rate of 20g/hr with a small quantitative pump. Nitrogen was used as carrier gas.

Sampling after 5 hours:
The conversion of catechol : 47.5%
The selectivity and yield of guaiacol : 94% and 44.7%, respectively
The selectivity of veratrol : 0.7%
Sampling after 70 hours:
The conversion of catechol : 50.1%
The selectivity and yield of guaiacol : 91.5% and 45.8%, respectively
The selectivity of veratrol : 0.9%
The amount of the catalyst remained constant after a long-term use of 60 hours.

EXAMPLE 6

The experiment was carried out by using the same catalyst and conditions as in Example 5 and feeding a mixture of catechol and ethanol in a ratio of 1:1 by weight with a rate of 20g/hr.
The conversion of catechol : 47%
The selectivity and yield of catechol monoethyl ether: 95% and 44.7%, respectively
The selectivity of catechol diethyl ether : 0.4%.

EXAMPLE 7

The experiment was carried out by using the same catalyst and conditions as in Example 5 and feeding a mixture of hydroquinone and methanol in a ratio of 1:3 by weight with a rate of 20g/hr.

The conversion of hydroquinone : 51%

The selectivity and yield of hydroquinone monomethyl ether : 83.4% and 42.5%

The selectivity of hydroquinone dimethyl ether : 9.5%.

EXAMPLE 8

The catalyst used was prepared by mixing aqueous solutions of aluminum sulfate ($Al_2(SO_4)_3$) and ammonium hydrogen phosphate ($NH_4)_2HPO_4$ so as to have an atomic ratio of Al/P = 1.0, neutralizing the mixture with an aqueous ammonia, filtering out the precipiate, washing with water, drying, tabulating and calcining at 800° C, and 15g of the catalyst thus obtained was used. The reaction tube used in Example 1 was used. After the reaction temperature was regulated to 280° C, a mixture of catechol and methanol in a ratio of 1:2 by weight including 0.003g of boron phosphate per one g of the mixture was fed in a rate of 35 g/hr. Nitrogen was used as carrier gas. After being cooled, the reaction mixture was collected and subjected to gas chromatography for analyzing guaiacol, veratrol and catechol.

Sampling after 5 hours:

The conversion of catechol : 45.1%

Selectivity and yield of guaiacol : 89.5% and 40.4%, respectively

The selectivity of veratrol : 0.8%

Sampling after 14 hours:

The conversion of catechol : 46.0%

The selectivity and yield of quaiacol : 90.3% and 41.5%, respectively

The selectivity of veratrol : 0.85%

Sampling after 24 hours:

The conversion of catechol : 44.8%

The selectivity and yield of guaiacol : 88.0% and 39.4%, respectively

The selectivity of veratrol : 0.7%

Sampling after 48 hours:

The conversion of catechol : 45.0%

The selectivity and yield of guaiacol: 91.3% and 41.1%, respectively

The selectivity of veratrol : 0.6%.

What is claimed is:

1. A process for preparing a monoalkyl ether of a dihydric phenol which comprises contacting from 2 to 0.1 part by weight of a dihydric phenol with one part by weight of a lower alcohol having from 1 to 4 carbon atoms with a catalyst comprising aluminum, boron and phosphorus at a temperature of from 250° to 350° C., the atomic ratio of Al:B:P in said catalyst being from 1:1:2 to 1:3:4.

2. The process as claimed in claim 1, wherein the dihydric phenol is substituted with a lower alkyl radical having from 1 to 4 carbon atoms or a halogen atom.

3. The process as claimed in claim 1, wherein said dihydric phenol and said lower alochol are so contacted in a gaseous state with a fixed bed of said catalyst at substantially atmospheric pressure.

4. The process as claimed in claim 1, wherein said dihydric phenol is catechol.

5. The process as claimed in claim 1, wherein said dihydric phenol is hydroquinone.

6. The process as claimed in claim 1, wherein said lower alcohol is methyl alcohol.

7. The process as claimed in claim 1, wherein said lower alcohol is ethyl alcohol.

8. The process as claimed in claim 1, wherein said monoalkyl ether is guaiacol, said dihydric phenol is catechol and said lower alcohol is methyl alcohol.

9. The process as claimed in claim 1, wherein said monoalkyl ether is catechol monoethyl ether, said dihydric phenol is catechol and said lower alcohol is ethyl alcohol.

10. The process as claimed in claim 1, wherein said monoalkyl ether is hydroquinone monomethyl ether, said dihydric phenol is hydroquinone and said lower alcohol is methyl alcohol.

* * * * *